March 1, 1966
J. S. McCARTNEY ETAL
3,237,870
SPRAY NOZZLE HAVING A FORWARD SURFACE ON
WHICH LIQUID FILMS
Filed Sept. 13, 1962
4 Sheets-Sheet 1
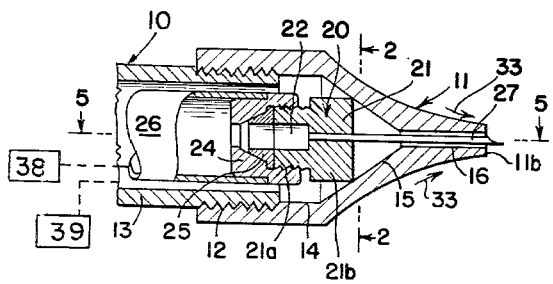
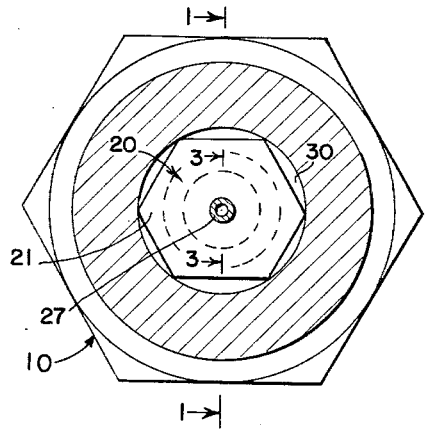
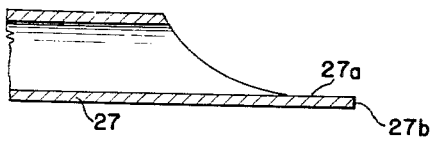
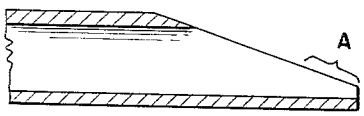
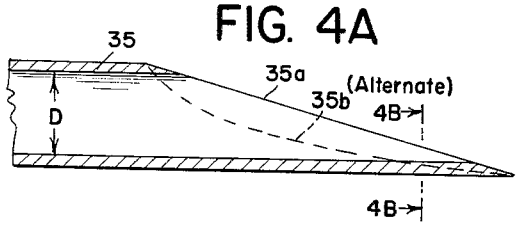
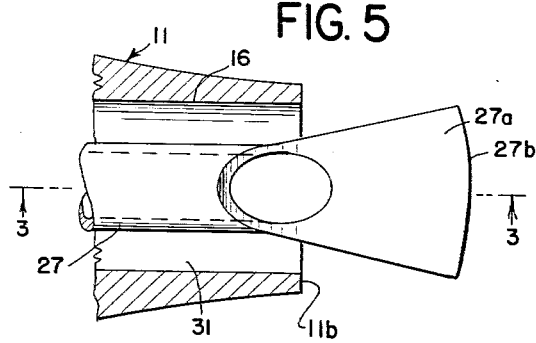
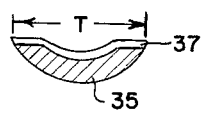
INVENTORS
JAMES S. McCARTNEY
RICHARD V. DeLEO
BY Dugger, Braddock,
Johnson & Westman
ATTORNEYS March 1, 1966  J. S. McCARTNEY ETAL  3,237,870
SPRAY NOZZLE HAVING A FORWARD SURFACE ON
WHICH LIQUID FILMS
Filed Sept. 13, 1962  4 Sheets-Sheet 2
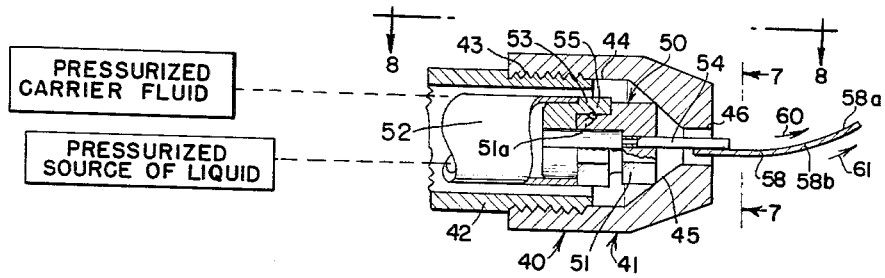
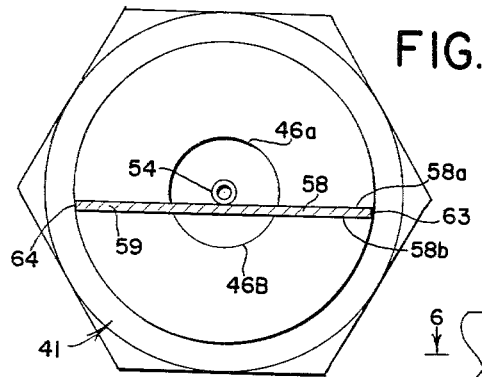
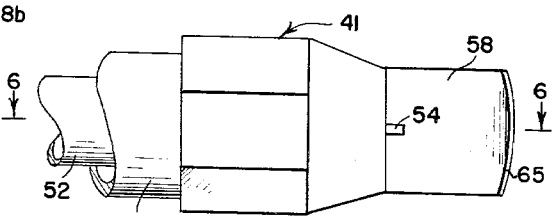
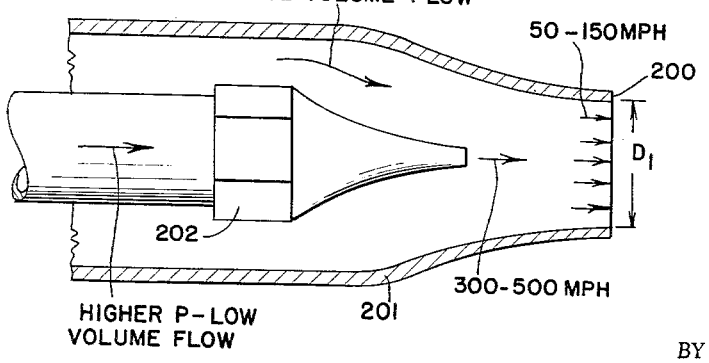
INVENTORS
JAMES S. McCARTNEY
RICHARD V. DeLEO
BY Dugger, Braddock,
Johnson + Westman
ATTORNEYS INVENTORS
JAMES S. McCARTNEY
RICHARD V. DeLEO
BY Dugger, Braddock,
Johnson & Westman
ATTORNEYS March 1, 1966  J. S. McCARTNEY ETAL  3,237,870
SPRAY NOZZLE HAVING A FORWARD SURFACE ON
WHICH LIQUID FILMS
Filed Sept. 13, 1962                                 4 Sheets-Sheet 4
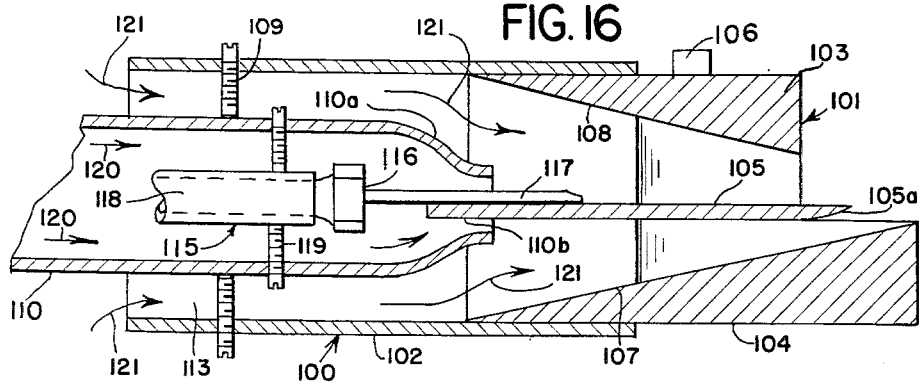
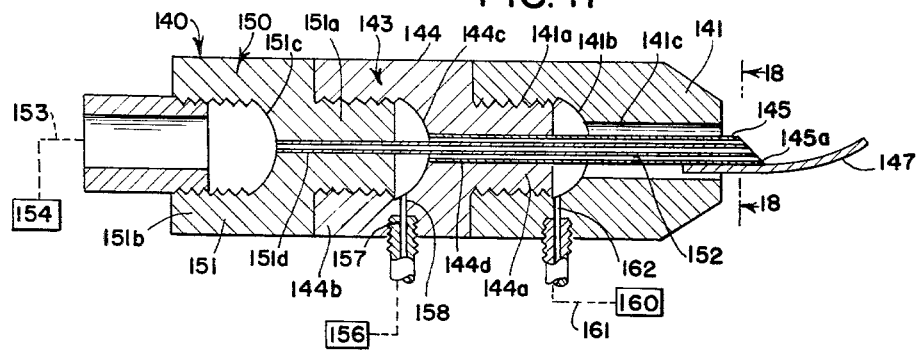
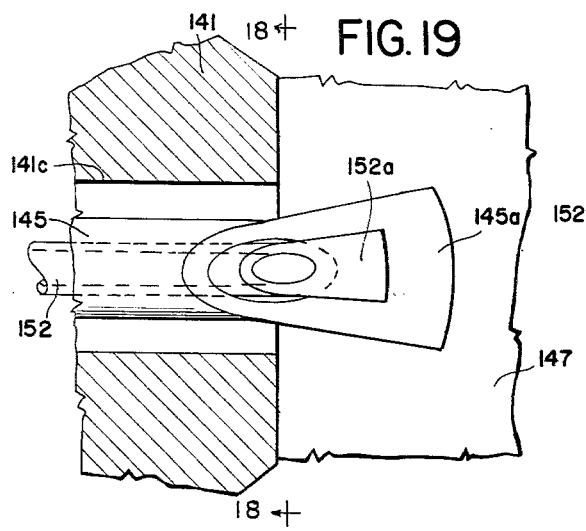
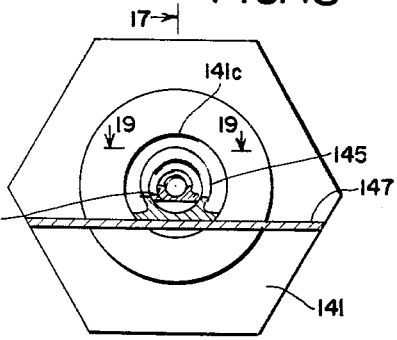
INVENTORS
JAMES S. McCARTNEY
RICHARD V. De LEO
BY Dugger, Braddock,
Johnson & Westman
ATTORNEYS United States Patent Office 3,237,870
Patented Mar. 1, 1966

3,237,870
SPRAY NOZZLE HAVING A FORWARD SURFACE ON WHICH LIQUID FILMS
James S. McCartney, St. Paul, and Richard V. De Leo, Hopkins, Minn., assignors, by mesne assignments, to Rosemount Engineering Company, a corporation of Minnesota
Filed Sept. 13, 1962, Ser. No. 223,428
6 Claims. (Cl. 239—424)

This invention relates to a new and novel spray nozzle. More particularly, this invention relates to a new and novel spray nozzle wherein the liquid to be sprayed is discharged under pressure to be moved forwardly over a surface and on said surface is permitted to diverge in a forward direction, there being provided a carrier fluid passing adjacent said surface to cause the liquid to form a film on said surface and break the liquid into small droplets and causes the droplets to move in the direction desired.

An object of this invention is to provide a new and novel spray nozzle to discharge under pressure a stream of liquid flowing in a given direction and break said liquid stream into a film and then into fine droplets by a separate stream of pressurized fluid that is at least initially flowing in the same general direction as the discharged stream of liquid. Another object of this invention is to positively convey a stream of pressurized liquid to a given location and then cause said liquid to form a thin film and subsequently fine droplets by discharging a stream of high velocity fluid that at least initially is flowing adjacent and in the same general direction as said stream of liquid as it is discharged.

A further object of this invention is to provide a new and novel spray nozzle for forwardly conveying and discharging a stream of liquid under pressure onto a planar surface and subject the discharged stream to the action of a first high velocity fluid stream that causes the liquid on said planar surface to first form a thin film and then droplets and subsequently to the action of a second high velocity fluid stream as the intermingled first stream of fluid with liquid leaves the planar surface. Another object of this invention is to provide a new and novel spray nozzle for carrying out the immediately proceeding object and additional to cause each of said streams of fluid to be deflected through a curved path forward of the location of the discharge of liquid onto the planar surface. An additional object of this invention is to provide a new and novel spray nozzle to carry out the first mentioned object of this paragraph and additionally to cause each of the streams to first converge, and subsequently to further converge in one transverse direction and diverge in a second transverse direction perpendicular to said one transverse direction prior to being discharged at a location adjacent said planar surface.

Other and further objects are those inherent in the invention herein illustrated, described, and claimed, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein corresponding numerals refer to the same parts and in which:

FIGURE 1 is a vertical, longitudinal, cross-sectional view of the first embodiment of the spray nozzle of this invention together with portions of the supply lines connected to said nozzle, said view being generally taken along the line and in the direction of arrows 1—1 of FIGURE 2;

FIGURE 2 is an end view, part in cross-section, of the spray nozzle of the first embodiment, said view being generally taken along the line and in the direction of the arrows 2—2 of FIGURE 1;

FIGURE 3 is an enlarged fragmentary longitudinal cross-sectional view of a liquid discharge tube of the first embodiment, said view being generally taken along the line and in the direction of arrows 3—3 of FIGURE 2 to more clearly illustrate the configuration of the outer end of said discharge tube.

FIGURE 4 is a view of the discharge tube that corresponds to FIGURE 3 other than that said view is taken prior to the time the outer end of the tube is flattened and flared;

FIGURE 4A is an enlarged fragmentary cross sectional view of a modified discharge tube that may be used in place of that illustrated in FIGURE 3, provided the discharge tube is of a relative small diameter;

FIGURE 4B is a transverse cross sectional view taken along the line and in the direction of the arrows 4B—4B of FIGURE 4A to more clearly show the formation of the film on the discharge end of the tube;

FIGURE 5 is an enlarged fragmentary top view, partly in cross section, of the discharge end of the nozzle of the first embodiment to more clearly show the flared end of the discharge tube of FIGURE 3;

FIGURE 6 is a longitudinal cross-sectional view of the second embodiment of the spray nozzle of this invention together with the supply lines connected thereto, said view being generally taken along the line and in the direction of the arrows 6—6 of FIGURE 8 other than a portion of the discharge subassembly is not shown in cross-section;

FIGURE 7 is an end view of the nozzle of FIGURE 6, said view being generally taken along the line and in the direction of the arrows 7—7 of FIGURE 6 to more clearly show the relationship between the nozzle body bore, the outlet end of the discharge tube and the deflector plate;

FIGURE 8 is a plan view of the nozzle of FIGURE 6 generally taken along the line and in the direction of the arrows 8—8 to more clearly show the relative locations of the deflector plate, and the forward ends of the nozzle body and discharge tube;

FIGURE 16 is a longitudinal cross sectional view of the fourth embodiment of this invention, the primary difference of the third and fourth embodiments being the connection of the supply lines to said nozzle;

FIGURE 17 is a longitudinal cross sectional view of the fifth embodiment of this invention, said view being generally taken along the line and in the direction of the arrows 17—17 of FIGURE 18;

FIGURE 18 is generally an end view of the fifth embodiment showing portions in cross section, said view being taken along the line and in the direction of the arrows 18—18 of FIGURE 17;

FIGURE 19 is an enlarged fragmentary cross sectional view generally taken along the line and in the direction of the arrows 19—19 of FIGURE 18 to more clearly show the flared ends of the discharge tubes; and FIGURE 20 is a diagrammatic illustration of operational features of the first four embodiments of this invention.

Figure 9:
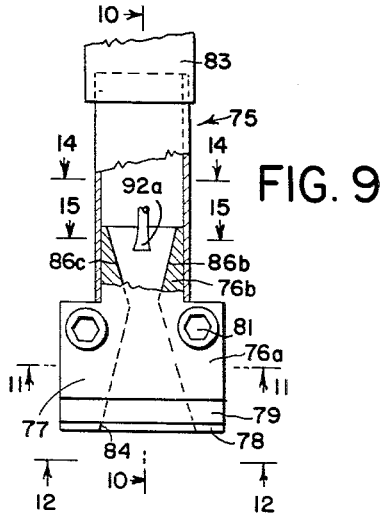
FIGURE 9 is a plan view of the third embodiment of the spray nozzle of this invention, together with the fluid supply line connected thereto, portions of said nozzle being broken away to more clearly illustrate the configuration of the upper chamber formed in said nozzle.

Referring now in particular to FIGURES 1, 2 and 5, the first embodiment of the spray nozzle of this invention, generally designated 10, will now be described. The spray nozzle 10 includes a nozzle body 11 that is elongated in an axial direction. The rearward end portion of the nozzle body has internal threads 12 to permit the nozzle body being threaded onto one end of the fluid supply line 13, the opposite end of the line being appropriately connected to a source of pressurized fluid 39. The forward axial end portion of the nozzle body in longitudinal cross section is tapered in an axially forward direction to be of decreasing radii in a forward direction, and is somewhat frusto-conical in shape wherein the minor base forms the outer end 11b of the body.

The nozzle body encloses a main chamber 14 which advantageously may be cylindrical in shape, an intermediate chamber 15 that is generally of a frusto-conical shape wherein one end thereof is coextensive with the main chamber, and an axially elongated bore 16 that at one end is coextensive with the minor base end of the intermediate chamber and at the other end opens to the atmosphere through the outer end 11b of the body. As it may be noted in FIGURE 1 the diameter of the bore 16 is substantially smaller than the diameter of the main chamber 14.

Mounted within the main chamber 14 and intermediate chamber 15 to extend outwardly through the bore 16 is a discharge subassembly 20 that is elongated in an axial direction and includes a discharge tube mounting member 21 having a generally cylindrical shaped main chamber 22 formed therein. The mounting member includes an externally threaded portion 21A to have an annular fitting 24 threaded thereon, said fitting in turn placing the liquid supply line 26 in fluid communication with the chamber 22. An annular seal member 25 is positioned in the fitting to provide a seal between members 21 and 24.

The end portion of line 26 connected to fitting 24 is located within the corresponding end portion of line 13 to provide an annular space between said end portions while the opposite end of line 26 is connected to a source of liquid 38. The liquid is forced under pressure through line 26 and into the discharge sub-assembly.

The opposite axial end portion 21b of the mounting member is of a larger cross sectional area and advantageously may be hexagonal in shape. The portion 21b has an axial aperture formed therein that opens into the chamber 22, there being an elongated tube 27 mounted on the portion 21 to have one end thereof extend through said aperture and open to the chamber 22. With the mounting member mounted in the hollow interior of the nozzle body, corner portions of the hex head 21b bear against the inner peripheral walls of the tapered intermediate chamber to form fluid passageways 30 whereby the fluid in the main chamber may pass between the inner pheripheral wall of the inner chamber and the outer surface of the mounting body and thence through the annular space 31 between the inner peripheral wall of bore 16 and the outer peripheral surface of the tube, and also to position the discharge sub-assembly 20. The tube extends forwardly of the mounting member and axially through the bore, the outer diameter of the tube being substantially smaller than the diameter of said bore whereby the aforementioned annular space 31 is provided.

The outer axial end of the tube is flared and flattened at 27A to provide a planar liquid distributing surface, the outer edge of the tube being arcuately curved at 27b and the outer longitudinal edges of said flared portion 27a converging in a rearward direction from said arcuate edge to form a continuous extension of the tubular portion of the tube. In longitudinal vertical elevation the outer longitudinal edges of said flared portion intermediate the planar surface 27a and the tubular portion of the tube generally subtend a concave arc (see FIGURE 3).

In order to form the outward flared end portion described heretofore, particularly with intermediate diameter tubes, the outer end portion may be diagonally cut as illustrated in FIGURE 4 and thence the portion illustrated under bracket A of FIGURE 4 pounded down to provide the flared flat surface 27a described heretofore.

In the event that a very small diameter (inside) discharge tube having an inside diameter in of the approximate range of 0.005 to 0.020 inch, it has been found that it is not necessary that the discharge tube have a flattened flared end portion. Rather a discharge tube 35 having an inside diameter D in the aforementioned range may be used in place of tube 27, the tube 35 being provided with a straight beveled cut 35a of 10°–15° or alternately a curved beveled cut 35b (see FIGURE 4A). With tubes having such small inside diameters, the exposed tubing wall, which is of a thickness T as shown in FIGURE 4B, provides a surface on which the liquid film 37 forms, film 37 having film width that is the same as dimension T.

The structure of the first embodiment of the spray nozzle of this invention having been described the structure of the second embodiment, generally designated 40, will now be set forth. The embodiment 40 includes a nozzle body, generally designated 41, having an internally threaded portion 43 for being threaded on one end of a fluid supply line 42. The nozzle body also includes a generally cylindrical main chamber 44 that at one end opens to the hollow interior of the fluid supply line and at the opposite end opens to the intermediate chamber 45, the intermediate chamber being tapered in an axially forward direction to have the forward axial end open to one end of the axially extending bore 46. The forward end portion of the nozzle body which surrounds the intermediate chamber and the bore may advantageously have its outer end tapered, however, it is not necessary that it be tapered to the same extent or in the same manner as that illustrated with the first embodiment.

Mounted within the nozzle body is a discharge sub-assembly, generally designated 50, that includes a discharge tube mounting member 51 and an annular fitting 53. Although members 51 and 53 may be constructed similar to that of members 21 and 24 of the first embodiment and connected as disclosed in accordance with the disclosure relative the first embodiment, member 51 as illustrated has a non threaded reduced end portion 51a with an annular recess formed therein for mounting an O-ring 55. Annular fitting 53 accordingly has an enlarged diameter bore into which the end portion 51a fits whereby the O-ring abuts against the peripheral wall of said bore to form a fluid seal between members 51, 53 and removably retain them in an assembled relationship.

As may be noted in FIGURE 6, one end portion of the liquid supply line 52 is located within the corresponding end portion of the fluid supply line 42, said one end portion of line 52 being mounted on the annular fitting 53 to place line 52 in fluid communication with the main chamber of the mounting member 51. The opposite end of line 52 is connected to a source of liquid which is forced under pressure through the line 52 to the discharge subassembly while the opposite end of line 42 is appropriately connected to a pressurized source of carrier fluid.

The forward end portion of the mounting member 51 which is hexagonal in cross section, abuts against the inner peripheral walls of the intermediate chamber in the same manner described relative to the first embodiment. Mounted on the mounting member 51 to have one end open to the main chamber thereof is an axially elongated tube 54, the mounting member main chamber being in fluid communication with the liquid supply line. The tube is of sufficient axial length that it extends outwardly through the bore and of a diameter to provide an annular fluid passageway between the inner peripheral wall of the bore and the outer circumferential surface of the tube.

Formed in the forward end portion of the nozzle body to have one end of the deflector plate 58 press fitted therein is a transversely elongated slot 59. As may be noted in FIGURE 7, the slot is formed such that the portion 46b of the annular space between the bore and the tube 54 opens to the bottom surface 58b of the deflector plate while the portion 46a opens to the top surface 58a of the deflector plate. The deflector plate is concavely curved (longitudinal cross section) to extend forwardly and divergingly curve outwardly from the longitudinal axis of the nozzle body, however, it is not curved in transverse cross section perpendicular to said axis. As may be noted in FIGURE 8 the forward edge 65 is arcuately curved.

The forward axial end of the tube may be flared and flatten to abut against the deflector plate (flared and flatten as illustrated in FIGURES 3 and 5); however, due to the provision of the deflector plate, which in effect replaces the flared end portion of the discharge tube, the discharge tube may be cut off blunt as illustrated in FIGURES 6 and 8 (front edge perpendicular to the axis of the tube). With a blunt end discharge tube, the liquid passing through the tube will film out on the adjacent curved surface of the deflector plate over a wide range of nozzle pressures including 1 to 30 p.s.i.g. and higher.

Referring now in particular to FIGURES 9–15 inclusive, the third embodiment of the spray nozzle, generally designated 75, will now be described. The third embodiment 75 includes a nozzle body generally designated 76 and a discharge sub-assembly generally designated 80. The nozzle body is made up of a fitting 82, a first body member 77, a second body member 78, a plate 79, and means 81 for retaining the body members and plate in an assembled condition. Means 81 may advantageously be screws extended through appropriate apertures formed in the first body member and the plate and threaded into the second body member.

Considering the direction of flow through the nozzle body as being in a longitudinal forward direction, the front portion 76a of the assembled plate and body members in a transverse plane is of a larger cross sectional area than the back portion 76b of said plate and body members on which the fitting 82 is mounted, said fitting being connected to a fluid supply line 83 which in turn is connected to a pressurized source of fluid (not shown). In order to facilitate connecting the fluid supply line to the assembled plate and body members, the back end portion of the fitting is circular in transverse cross section and the front end is rectangular.

Figure 10:
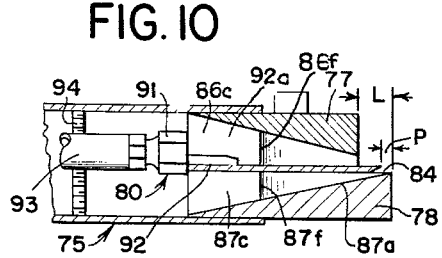
FIGURE 10 is a longitudinal cross sectional view generally taken along the line and in the direction of arrows 10—10 of FIGURE 9.
Figure 14:
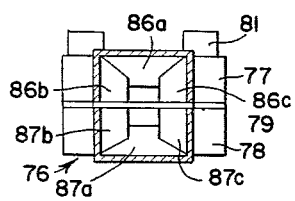
FIGURE 14 is a back transverse cross sectional view of the nozzle body of the third embodiment to show further details of the construction of the fluid chambers of said nozzle.

As may be noted more particularly in FIGURES 9 and 10, the back end portions of each of the members 77–79 in planes parallel to the longitudinal axis are of the same size and shape while the forward end portions are likewise of the same shape but of a larger transverse dimension. However, the forward end portion of the body member 77 is of a smaller longitudinal dimension than the second body member 78 by a dimension L while the plate is of a shorter longitudinal dimension than the body member 78 by a dimension P (see FIGURE 10). The dimension P is substantially smaller than the dimension L. The forward end portion of the plate is upwardly curved in a longitudinal direction to form a sharp transverse front edge.

Figure 11:
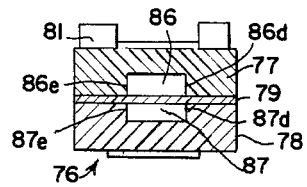
FIGURE 11 is a transverse cross-sectional view of the nozzle body generally taken along the line and in the direction of arrows 11—11 of FIGURE 9 to more fully illustrate the configuration of the fluid channels extending therethrough.
Figure 12:
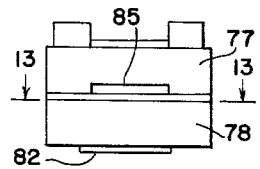
FIGURE 12 is an end view of the third embodiment of the spray nozzle of this invention, said view being generally taken along the line and in the direction of arrows 12—12 of FIGURE 9.
Figure 13:
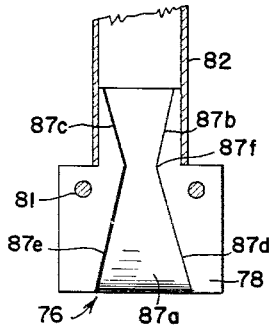
FIGURE 13 is a top sectional view of the nozzle body generally taken along the line and in the direction of arrows 13—13 of FIGURE 12 to more fully illustrate the configuration of the bottom fluid chamber of the spray nozzle.

The first body member is recessed such that in conjunction with the top of the plate 79 there is formed a fluid chamber 86 that at the longitudinal rearward end opens to the interior (main chamber) of the fitting and at the opposite end opens through a rectangular opening 85 to the atmosphere (see FIGURES 9–11). The second body member is also recessed to in cooperation with the opposite side of the plate form a second longitudinally elongated chamber 87 that at its rearward axial end opens to the interior of the fitting and at the opposite end opens at 84 to the atmosphere along the dimension P between the forward transverse edge of the plate and the adjacent transverse edge portion of the body member 78. The top chamber wall 86a of the chamber 86 is generally planar and in a longitudinally forward direction converges relative to the plate, while the bottom wall 87a of the chamber 87 likewise is planar and converges relative to the plate in a longitudinal forward direction. Thus the top and bottom chamber walls are also converged in a longitudinal forward direction.

The side walls 86b and 86c of the chamber 86 also converge relative to the longitudinal axis and one another in a forward direction throughout the longitudinal length of the back section and then at 86d and 86e respectively diverge from one another and from the nozzle body longitudinal axis to the front outer transverse edge of the member 77, the contiguous edges of walls 86b, 86d, 86c and 86e forming a throat 86f. Each of the walls 86b, 86c, 86d, and 86e is planar. Likewise chamber 87 includes planar side walls 87b, 87c, 87d, and 87e, the walls 87b and 87c converging toward one another in a longitudinally forward direction and the walls 87d and 87e diverging from one another in a longitudinal forward direction. Contiguous edges of the side walls 87b, 87c and 87d and 87e form the throat 87f.

The planar wall 87a is inclined at an angle such that the top planar surface of the second body member and the front planar surface of wall meet at a common transverse line. Thus the opening 84 is bound by the front edge of the plate, said line, and the transverse edges of the side walls 87d and 87e intermediate the plate and said line.

Figure 15:
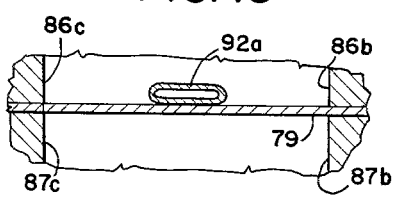
FIGURE 15 is an enlarged fragmentary cross-sectional view of the nozzle body and discharge tube generally taken along the line and in the direction of the arrows 15—15 of FIGURE 9 to more clearly illustrate the construction of the discharge end portion of said tube.

Mounted within the fitting 82 and extending into the chamber 86 is the discharge tube sub-assembly 80 (see FIGURE 10). The sub-assembly 80 preferably includes a discharge tube mounting member 91 that advantageously may be of a construction as that described and illustrated relative to either the first or second embodiment. The mounting member 91 is located to have the forward surface thereof abut against the plate 79 and to mount the axially elongated tube 92 to extend forwardly of the upstream transverse edge of the plate 79. The forward end portion 92a of tube 92 is flattened as illustrated in FIGURES 9 and 15 to help the liquid passing through the tube to film. The liquid primarily films on the plate 79, provided high nozzle pressures are avoided, however, the flattened end portion 92a assists in filming process. The desired range of nozzle pressures for this embodiment are 1 to 10 p.s.i.g.

Connected to the mounting member 91 in the same manner described relative the first embodiment to extend rearwardly thereof is a liquid supply line 93 which in turn is connected to a source of liquid under pressure (not shown). A plurality of set screws 94 are threaded in appropriate apertures formed in the circular portion fitting to abut against the line 93 for holding the line and discharge tube sub-assembly in proper spaced relation with the flattened end 92a of the tube closely adjacent the upper surface of the deflector plate. Preferably there are provided four set screws which are mounted to extend at right angles relative to one another.

Referring now to FIGURE 16, the fourth embodiment of this invention, generally designated 100, will now be described. Embodiment 100 includes a nozzle body 101 that is of generally the same construction as that described with respect to the third embodiment. That is the nozzle body 101 includes a fitting 102, a first body member 103, a second body member 104, a plate 105 located intermediate said body members and having a sharp transversely extending front edge 105a, and screws 106 for removably retaining members 103–105 in an assembled condition. One end of the fitting is fitted over the back end portions of the assembled body members and plate which in an assembled condition are of a reduced transverse cross section area relative to the front end. The chamber 108, which is of the same contour as chamber 86, is enclosed plate 105 and the first body member 103; while the second chamber 107, which is of the same contour as chamber 87, is enclosed by plate 105 and the second body member 104.

A fluid supply line 110, which is connected to a source of pressurized fluid (not shown) of a smaller diameter than the diameter of the back circular portion of the fitting is extended into the fitting to have the front end thereof closely adjacent the chambers 107 and 108, there being provided a plurality of set screws 109, preferably four, for holding the fluid supply line in spaced relation to the fitting to provide a somewhat annular space 113 intermediate the fitting and the fluid supply line. The forward end portion 110a of the line 110 in an axially forward direction is first curved divergingly inward and then extends a short distance parallel to the axis of the nozzle body, there being a slot 110b formed in end portion 110a to have the rearward portion of the plate 105 extended thereinto. This permits fluid flow (arrows 120) on one side of plate 105 to pass into chamber 108 and on the opposite side into chamber 107.

Located within the fluid supply line and extending a substantial distance into the chamber 108 as shown in FIGURE 15 is the discharge tube sub-assembly 115, sub-assembly 115 being of the same construction as the discharge tube sub-assembly of the third embodiment. That is, the sub-assembly 115 includes a tube mounting member 116 (same as that of either the first or second embodiment) for mounting an axially elongated tube 117 which at one end opens to the mounting member hollow interior and at the other end has an end portion that opens to the atmosphere longitudinally intermediate the rear end portion of the first body member and the front transverse edge of the plate 105 as described relative the third embodiment. Connected to the opposite end of the mounting member is a liquid supply line 118 which in turn is connected to a source of liquid under pressure, there being provided a plurality of set screws 119 threaded into appropriate apertures in the fluid supply line for holding the liquid line in spaced relation thereto.

By mounting the fitting and supply lines in the aforementioned manner and upon forcing pressurized air through the fluid supply line in direction of the arrows 120, pressurized air moves through the chambers 107 and 108 and out through the front openings of the chambers. At the same time, the movement of pressurized air through end portion 110a, which is at a high velocity, induces flow 121 in between the fitting and the fluid supply line, this air moving through space 113 likewise moving outwardly through the chambers 107, 108. The combined flows 120, 121 breaks up the film at the front end of the plate 105.

The fourth embodiment of this invention having been described, the structure of the fifth embodiment, generally designated 140, will now be set forth. The fifth embodiment includes a nozzle body 141 having an internal threaded rear portion 141a that encircles a main chamber, an intermediate chamber 141b that is somewhat hemispherical in shape, and a bore 141c that opens to the atmosphere through the forward end portion, the forward end portion having an outer surface configuration very similar to that of the second embodiment. The intermediate chamber is located between the main chamber and the bore and places them in fluid communication with one another.

A first discharge subassembly, generally designated 143, includes a discharge tube mounting member 144 having an externally threaded reduced diameter end portion 144a that is threaded into the rear portion 141a of the nozzle body and an internally rear portion 144b that encloses a main chamber. Axially forward of the main chamber and coextensive therewith is a generally hemispherical intermediate chamber 144c, the forward portion of chamber 144c opening to bore 144d that extends through the end portion 144a. Mounted in the bore 144d is an elongated discharge tube 145, the tube 145 extending through the nozzle body intermediate chamber and bore 141c to have its flared end 145a located closely adjacent the curved deflector plate 147. The deflector plate 147 advantageously is of the same shape as plate 59 and mounted on the nozzle body 141 in a manner corresponding to the mounting of plate 59 in nozzle body 41. The tube 145 and bore 141c provide an annular space to conduit fluid from chamber 141b to pass in contact with both the upper and lower surface of plate 147 whereas the fluid passing through tube 145 is only passed in contact with or above the upper surface of said plate.

A second discharge tube assembly, generally designated 150, includes a discharge tube mounting member 151 having an externally threaded reduced diameter end portion 151a that is threaded into the rear portion 144b of mounting member 144 and an internally threaded rear portion 151b that encloses a main chamber. Axially forward of the last mentioned main chamber and coextensive therewith is generally hemispherical intermediate chamber 151c, the forward end of chamber 151c opening to bore 151d that extends through the end portion 151a. Mounted in bore 151d is an elongated discharge tube 152 which is of a smaller diameter than tube 145 and extends axially through chambers 144c, 141b to have its forward flared end 152a overlay flared end 145a. One end of a liquid supply line 153 is threadedly connected to the internally threaded end portion 151b, the opposite end being connected to a source 154 of a first liquid which is forced under pressure through line 153, and tube 152 to film on the flared end 152a.

A source 156 of a second liquid is forced under pressure through line 157, radially extending passage 158, chamber 144c and the annular space between tubes 145 and 152 to film over the flattened flared end 145a, a portion of passage 158 being threaded to have one threaded end of line 157 connected thereto. Likewise a source of pressurized fluid 160 is connected via line 161 to the nozzle body 141 to flow through passage 162, chamber 141b and the annular space between the wall of bore 141c and tube 145, the flow of fluid from source 160 over plate 147 being similar to that described relative the second embodiment.

The fifth embodiment is advantageously used in spraying where two different types of liquid mixtures are to be sprayed or where it is desired to spray a mixture of two chemicals, but due to reaction between the chemicals, they can be mixed only shortly before they are sprayed. For example it may be desired to simultaneously spray both a fungicide and an insecticide which undesirably react with one another if mixed prior to being sprayed. With the fifth embodiment the fungicide may be supplied through source 154 and the insecticide through source 156 while the pressurized carrier fluid (such as air) is applied through source 160. This way the insecticide cannot mix with the fungicide until they reach the flatten flared ends 152a and 145a respectively which gives the chemicals insufficient time to react before being transported by the carrier to the area to be sprayed. However due to filming on the respectively flared ends and the deflector plate and subsequent formation of fine droplets, the combined movements of the fungicide, insecticide and carrier causes an intimate mixing of the insecticide and fungicide prior to being transported to the area being sprayed.

In the event a resin is to be sprayed, for example an epoxy resin such as Desco's "Armito," sold by Desco International Association, the accelerator may be provided at 154, the resin at 156 and the carrier at 160. Thus the resin may be sprayed onto the desired surface without danger of setting prior to reaching the surface even though it is a fast setting resin. The ranges of pressures for the liquids and carrier may be the same as disclosed herein for the other embodiments.

In the event that a third liquid is to be sprayed in combination with two other liquids, the discharge subassembly 150 is provided with a radial passage as illustrated for member 143 to connect source 154 to the intermediate chamber 151c of the thus modified subassembly. Also another discharge subassembly similar to member 150 is provided, the primary difference being that said another subassembly would have a smaller diameter, axially longer discharge tube that would be extended through tube 152a when said another subassembly is connected to the modified subassembly 150. The source of the third liquid is connected to the another subassembly as ilustrated with reference to source 154 to member 150.

In using the first embodiment of spray nozzle of this invention, the fluid supply line 13 is connected to a source of pressurized fluid, for example, air; while the liquid supply line 26 is connected to apppropriate source of liquid which is forced under pressure through line 26. For example if the spray nozzle is to be used for humidifying purposes, then the liquid consists of water; whereas, if it is used for spraying, for example, insecticides, the line 26 is connected to a source of liquid that contains the desired type insecticide to be sprayed plus a sufficient amount of carrier, and/or solvent to dilute the insecticide to the desired concentration. The pressurized air flows through the annular space provided between the discharge tube sub-assembly and the nozzle body, through the openings 30 (FIGURE 2) at a relatively high velocity (the openings 30 at 300–500 miles per hour), and thence through the annular space 31 over the outer flared end of the tube or if the diameter of the tube is small the forward non flared end. At the same time liquid under pressure is forced through the fluid supply line into the chamber 22 and thence through the hollow interior of the tube and outwardly onto the planar surface 27a. The air flowing over the outlet end of the tube comes in contact with the liquid being discharged from the tube and causes the liquid to form a thin film on the planar surface 27a which then directly forms very small droplets (for example, less than 10 microns), the film being broken up before surface tension has a chance to recombine the droplets. As the film is directly converted to small droplets rather than to big drops and to small drops, it does not allow a film to break into steamlets (filaments) and thence into droplets.

Air being discharged under pressure through the outlet end of the annular space 31 causes air to flow in the direction of arrows 33—33 along the outer surface of the taper end portion of the nozzle body. Since the end 11b is of a relatively small diameter, compared to the cross section dimension of the portion surrounding the main chamber, the air flow 33—33 at the end 11b is generally forwardly and aids in dispersing the spray at the outer arcuate edge 27b of the flared end of the tube.

By causing the film to directly form small droplets, 10 to 30% of the amount of chemical insecticide that would otherwise be used, is sufficient since each of the small droplets has a smaller concentration of chemical, but due to the fact that there are a large number of the droplets there is provided better coverage and therefore requires smaller total amount of the chemical. Further through providing very small drops the total volume of the carrier used, for example water, is relatively low. That is, where normally 100 gallons of water would be used, with the spray nozzle of this invention, 5 to 10 gallons is satisfactory for spraying the same quantity of insecticide and at the same time obtain better coverage. Thus the air jet primarily acts to break up the liquid mixture and secondarily to carry the droplets of insecticide to the material to be sprayed. With the nozzle of this invention in usage for humidification, the small water droplets coming off the edge 27b of the planar end of the tube are so fine that they are in vapor form before traveling six inches from the edge 27b; however if being used to spray for example, insecticides evaporation usually will not take place this fast due to the chemicals being used.

In order to further illustrate the invention but not as a limitation thereof the following dimensions are set forth. The inner diameter of the bore 16 can be 0.040–0.060 inch while the outer diameter of the tubular portion of the tube is 0.020 inch and the inner diameter is 0.010 inch. With the spray nozzle having the aforementioned dimensions and the water or other liquid to be sprayed under pressure of aproximately 15 pounds or less per square inch and air under pressure of 10–30 pounds per square inch, one half gallon of liquid is sprayed per hour.

The operation of the second embodiment of the spray nozzle of this invention is very similar to that described relative to the first embodiment other than for the additional features set forth hereinafter. The fluid supply line 42 is connected to a pressurized source of fluid such as air and the liquid supply line 52 connected to the pressurized source of liquid, for example water, said lines being connected to the nozzle body 41 and discharge tube subassembly 51, respectively. The water discharged through the tubular end portion of the tube 54 forms a very fine film as it passes over the planar surface of the flared end of the tube as described heretofore relative the first embodiment or over the deflector plate if a blunt end tube is provided; and the film forms very fine droplets as it leaves the outer arcuate edge 65 of the plate. That is with a flared end tube the fluid flow through the upper portion 46a of the annular passage subjects the liquid on the flared end to a first shear as it comes out of the tube to first form a film and then fine droplets or with a blunt end tube a first shear over the deflector plate. The fine droplets following the curved surface 58a of the deflector plate (arrow 60) move outwardly off the edge 65 and then are subjected to a second air shear in that the air flowing through the passageway portion 46b follows along the under curved surface 58b (arrow 61) to contact the droplets as they pass over the arcuate edge 65. For many purposes the deflector plate (even with a blunt end tube) gives an even better type spray than that obtained with the first embodiment, particularly, where larger quantities are desired since a larger diameter discharge tube (for example tube 54) can be used as the film is formed on the deflector plate, not on a flared tube. In this connection it is to be noted that even though the back surface 58b is curved in a forwardly direction to diverge from the axis of the bore the air still follows the back surface due to the Coanda effect.

Advantages of the second embodiment over the first is that larger liquid quantities, for example, 2 gallons per hour, can be sprayed and also a more flatten spray is obtained which covers a larger area. As a result ease of spraying larger areas is facilitated.

The operation of the third embodiment of this invention is quite similar to that described relative to the second embodiment other than that the liquid in flowing out the flatten end 92a of the discharge tube does not move over a curved deflector plate, but rather passes over the planar surface of the plate 79. Also the air flowing through chambers 86 and 87 flows through a diverging path as it moves forwardly of the throat 86f, 87f and adjacent the flatten end 92a. However in a direction perpendicular to the planar surface of the plate the air flow converges in a forward direction as it passes outwardly through the respective outlet openings of the chambers 87 and 86 and thus through converging paths relative to one another and thereby tends to flow in an axial direction rather than being deflected through a curved path such as occurs in using the second embodiment of the invention.

The operation of the fourth embodiment is very similar to that of the third embodiment other than that in addition to the air under pressure flowing through the fluid supply line, additional air is drawn into the annular spaced intermediate fluid supply line and the fitting; thereby without additional power requirements for pressurizing the air, a larger volume of air is passed through the chambers 107 and 108 than if the annular space 131 to the atmosphere between the fitting and the fluid supply line were not provided.

Although the outer surfaces of the discharge tube mounting members has been described as being hexagonal where they abut against portions of the nozzle body it is to be understood they could be otherwise configured as long as sufficient space is provided for fluid to flow from the main chamber of the respective nozzle body to the bore or chambers that discharge to the atmosphere. Also it is to be understood that the mounting member 91 could be mounted in the rear portion of chamber 86 so long as sufficiently large passages were provided between the chamber walls 86b, 86c, 86d and 86e and the mounting member to provide the desired fluid flow through chamber 86. Additionally it its to be understood that in the fifth embodiment the members 141, 144 and members 144, 150 respectively may be construed to be connected as described and illustrated relative to members 51, 53 of the second embodiment. For example end portion 141a may be non threaded while end portion 144a likewise may be non threaded but provided with an annular recess and an O-ring to form a fluid seal and hold the thus modified members 141, 144 in an assembled condition.

It is to be mentioned that any one or all of the first four embodiments can be used with a carrier fluid (air) flow which is used primarily to transport the droplet mixture (provided it is not being used for humidification or etc. where liquid evaporates very rapidly) to a target area. As a further illustration of the invention, the exit velocity of the carrier through the forward axial opening 200 of the nozzle body 201 can be in the range of 50 to 150 m.p.h wherein a low pressure large volume flow of carrier fluid passes into the nozzle body and a higher pressure-low volume flow of liquid passes into the discharge tube assembly 202, as indicated on the diagrammatic illustration of FIGURE 20. The exit velocity of the liquid from the discharge assembly in such cases is in the range of 300–500 m.p.h. By using a large volume flow-low pressure flow of fluid, fluid can be transported a distance up to 200 diameters, D, of the exhaust jet. Hence if D is 1 inch, the fluid in the exhaust jet is transported up to 200 inches.

In the first embodiment, if a relative larger diameter discharge tube is used, the liquid film forms on the flared end of the discharge tube while if it is of relative small diameter the discharge end of tube need not be flared but only beveled as previously indicated. In the second, third and fourth embodiments, the discharge tube flared end portion is in effect replaced by the curved deflector plate (second embodiment) or a flat thin plate (third and fourth embodiments). In other words, the film forms on a curved deflector plate or flat plate for the second, third and fourth embodiments. Thus in the second embodiment, the front axial end of the discharge tube may be cut off blunt since liquid will film-out on one side of the curved surface over a wide range of nozzle pressures of 1.30 p.s.i.g. and probably higher. In the third and fourth embodiments, the liquid films over the flat deflector plate providing high nozzle pressures are not used, 1–10 p.s.i.g. being the more desirable range. In the third and fourth embodiments, the flatten end of the discharge tube assists the film forming process.

With respect to the second and fifth embodiments it is to be mentioned by using a deflector plate having a larger radius of curvature, a wider angle of spray is obtained. Also with respect to each of the embodiments the axial distance between the annular end of the discharge tube and the arcuate edge of the flared end portion or deflector plate on which the film is formed is increased if higher viscosity materials are to be sprayed while keeping the pressures the same.

As many widely apparently different embodiments of this invention may be made without departing from the spirit and scope thereof, it is to be understood that we do not limit ourselves to the specific embodiments herein.

What we claim is:

1. A spray nozzle comprising an axially elongated nozzle body having a rear main chamber, an intermediate chamber that opens at one end to the main chamber and is of a decreasing taper in an axially forward direction, and an axially extending bore that at one end opens to the reduced end of the intermediate chamber and at the other has an outlet opening that opens to the atmosphere, and an axially elongated discharge tube sub-assembly extending through the main chamber, intermediate chamber and the bore, said sub-assembly including a mounting member having a chamber formed therein and an axially elongated tube joined to said mounting member to open into its chamber and extending through said bore, said tube having an outer end portion extending forwardly of the nozzle body providing a liquid distributing surface downwardly of the opening of said outlet opening to the atmosphere, said mounting member having a portion bearing against the intermediate chamber wall that in conjunction with said wall provides a space for a fluid path between the main chamber and said bore, the diameter of the tube being substantially smaller than that of the bore and the diameter of the bore being of a substantially smaller diameter than the corresponding dimension of said nozzle body main chamber.

2. The structure of claim 1 further characterized in that said tube outer end portion is flatten and flared.

3. The structure of claim 1 further characterized in that said tube is of a diameter in the range of 0.005 inch to 0.020 inch and its outer end portion is bevel cut to have the liquid film over the tubular wall thereof.

4. Spray apparatus comprising a longitudinally extending nozzle body having a main chamber and a first longitudinally extending passage that at least at its forward end is of a substantial smaller transverse cross sectional area opening to said main chamber for placing the main chamber in fluid communication with the atmosphere, a first discharge tube subassembly including a discharge tube mounting member having a main chamber and extended into the nozzle body main chamber and an elongated tube having one end joined to said mounting member to open into the mounting member main chamber, extend substantially forwardly of said nozzle body main chamber and being elongated in the direction of elongation of said passage, said tube and mounting member having a liquid passageway therein and said subassembly and nozzle body cooperatively providing a fluid passageway that discharges to the atmosphere through said passage for transporting the liquid flowing from said liquid passageway, means connected to the discharging tube subassembly for forcing liquid under a positive pressure into the mounting member and thence through said liquid passageway, means connected to the nozzle body for forcing a carrier gas into the nozzle body main chamber and thence through said fluid passageway and said tube having an outer end portion forming a surface portion extending forwardly of said nozzle body on which the liquid flowing through the rest of the tube films and located to have said gas on opposite transverse sides of said surface portion to disperse the filmed liquid into a fine spray.

5. The structure of claim 4 further characterized in that said tube outer end portion is flattened and flared, the flared portion having outer longitudinal edges that diverge in a forward direction.

6. The structure of claim 1 further characterized in that there is provided means for supplying fluid under sufficiently high pressure to the nozzle body rear chamber that said fluid flowing through said fluid path has a velocity of 300–500 miles per hour.

References Cited by the Examiner

UNITED STATES PATENTS

| | | | |
|---|---|---|---|
| 801,360 | 10/1905 | Christensen | 239—424 |
| 911,646 | 2/1909 | Cook et al. | 239—422 |
| 1,071,381 | 8/1913 | Anthony | 239—422 |
| 1,129,540 | 2/1915 | Bergh | 239—420 |
| 1,211,792 | 1/1917 | Von Boden | 239—423 |
| 2,089,673 | 8/1937 | Steinmann | 239—424 |
| 2,623,783 | 12/1952 | Gustafson | 239—424 |
| 3,059,860 | 10/1962 | Hohn | 239—423 |
| 3,096,023 | 7/1963 | Thomas | 239—424 |
| 3,112,882 | 12/1963 | Gilbert | 239—422 |

FOREIGN PATENTS 517,897  12/1920  France.

M. HENSON WOOD, JR., *Primary Examiner.*

LOUIS J. DEMBO, EVERETT W. KIRBY, *Examiners.*